United States Patent [19]
Lam

[11] Patent Number: 6,140,934
[45] Date of Patent: Oct. 31, 2000

[54] MOTOR VEHICLE DISPLAY APPARATUS

[76] Inventor: Peter Ar-Fu Lam, 20104 Wayne Ave., Torrance, Calif. 90503

[21] Appl. No.: 09/472,569

[22] Filed: Dec. 27, 1999

Related U.S. Application Data

[63] Continuation-in-part of application No. 08/752,612, Nov. 19, 1996, Pat. No. 6,008,732.

[51] Int. Cl.[7] ........................................... G08B 5/00
[52] U.S. Cl. ..................... 340/815.4; 340/425.5; 340/438; 340/473; 340/815.4; 362/388; 362/488; 362/806
[58] Field of Search ............................. 340/815.4, 425.5, 340/473, 815.46, 815.54, 469, 438; 362/276, 84, 20, 488, 388, 806, 808

[56] References Cited

U.S. PATENT DOCUMENTS 5,844,472  12/1998  Lee ............................................ 340/438
6,008,732  12/1999  Lam ......................................... 340/815.4

*Primary Examiner*—Julie Lieu

[57] ABSTRACT

Display apparatus (300) is configured to be plugged into the cigarette lighter socket of a vehicle. Display unit (305) is configured to provide a gentle display mode to enhance the driving pleasure at night. In case of emergency, switch 323 triggers the display unit to provide high intensity blinking warning light. The display unit (305) can also be configured to provide various graphic, message or data information.

23 Claims, 9 Drawing Sheets

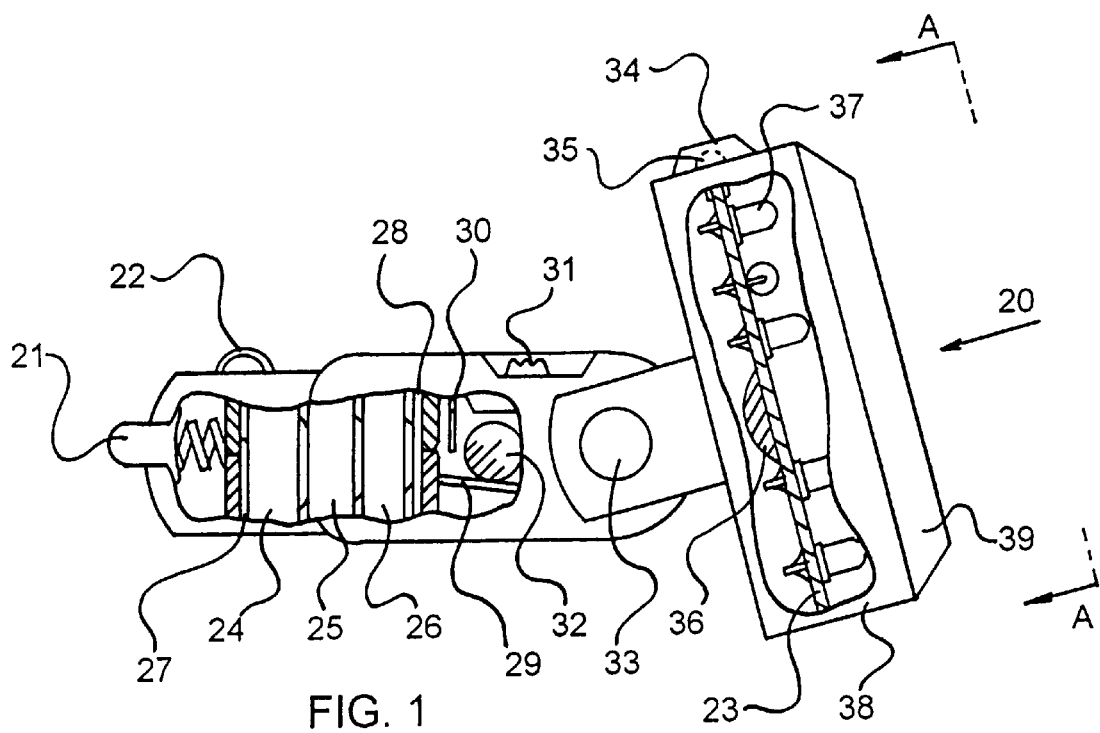
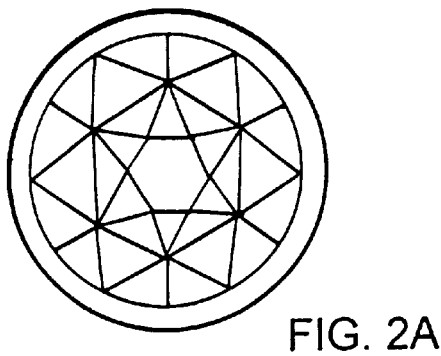
FIG. 2A
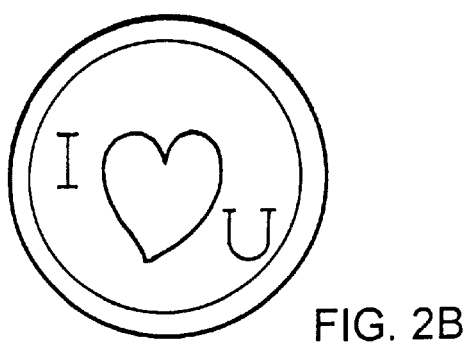
FIG. 2B
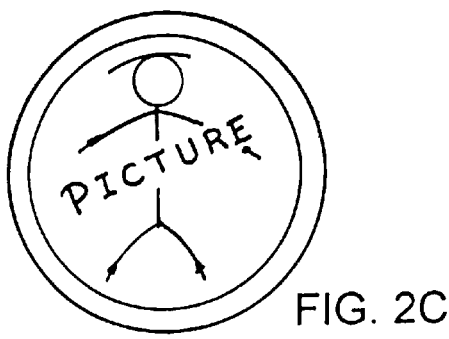
FIG. 2C
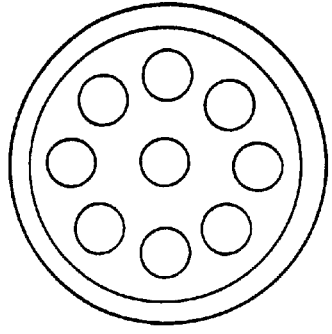
FIG. 2D

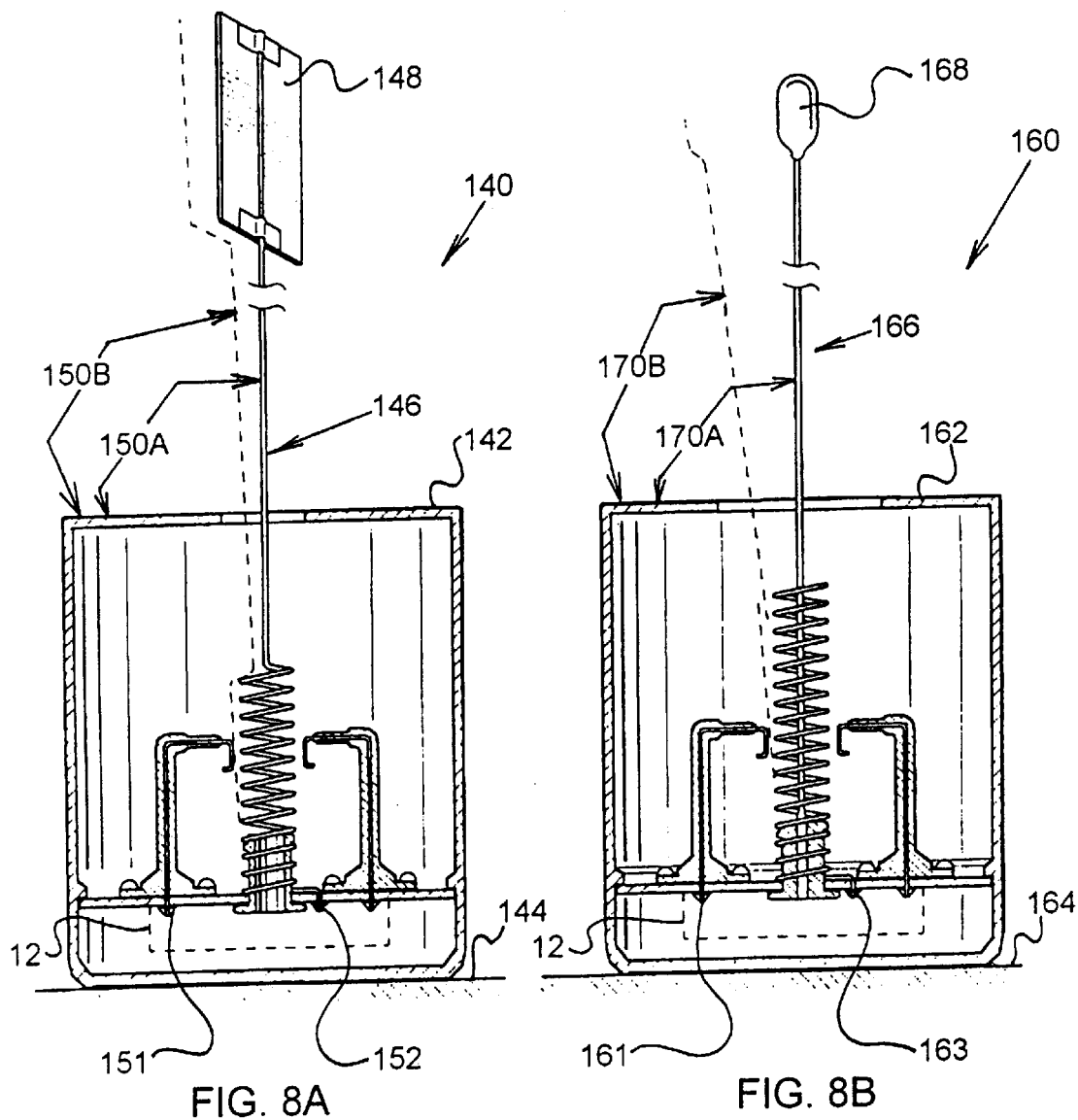

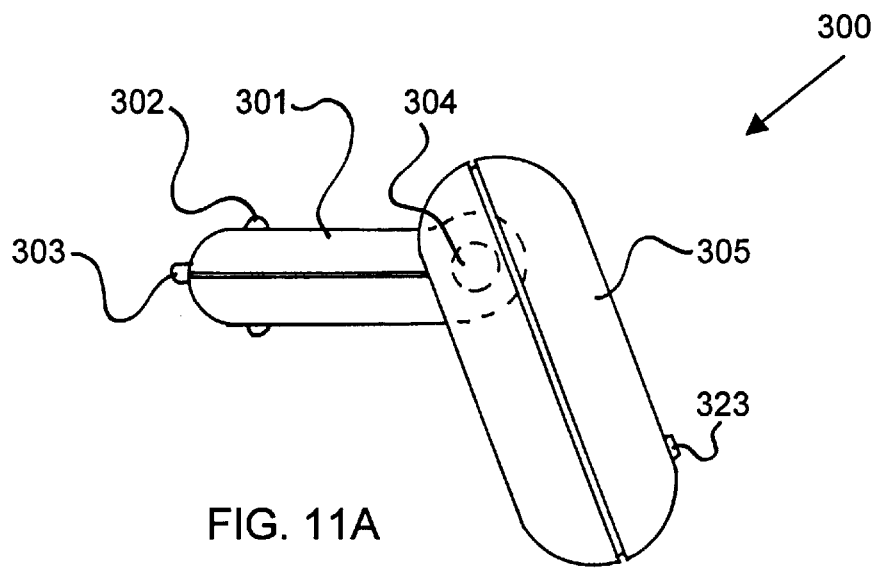
FIG. 11A
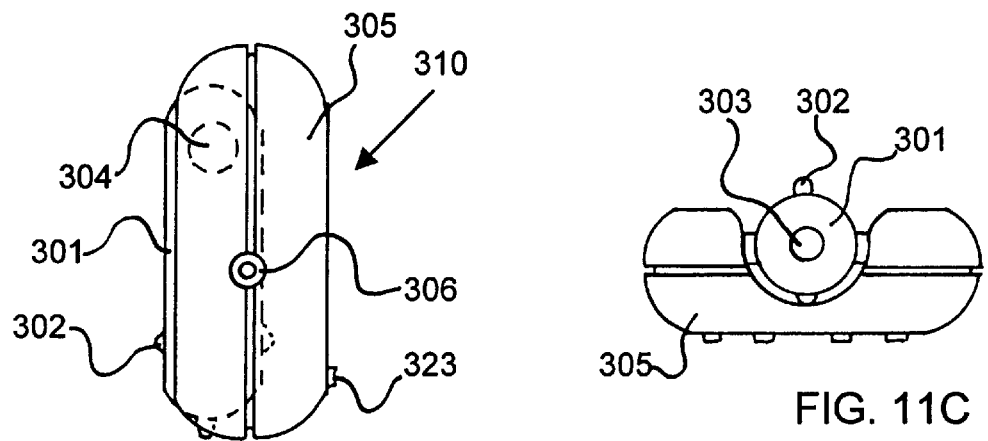
FIG. 11B
FIG. 11C
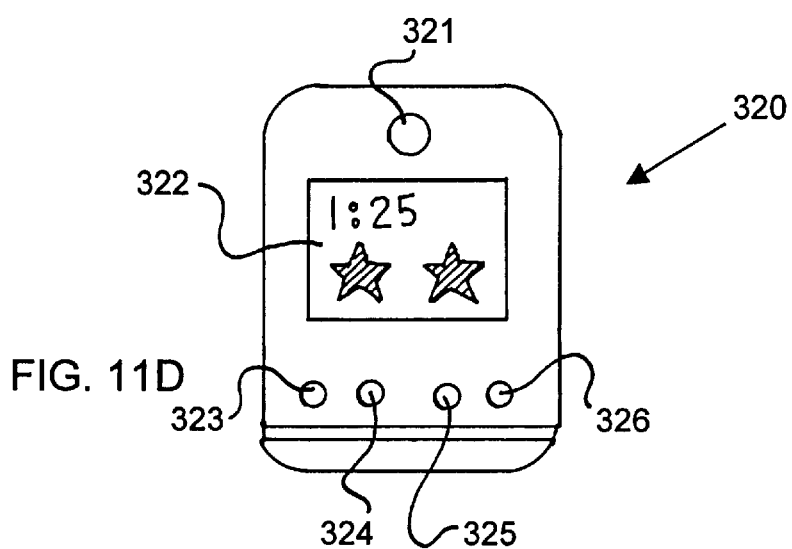
FIG. 11D

MOTOR VEHICLE DISPLAY APPARATUS

RELATED APPLICATIONS

This is a Continuation In Part of U.S. Patent Application No. 08/752,612 filed Nov. 19, 1996, now U.S. Pat. No. 6,008,732, which is incorporated herein by reference.

FIELD OF THE INVENTION

The present invention relates to display apparatus in used with motor vehicles for energizing light transducer in response to external perturbations; said display apparatus is also desirable to be detached from the motor vehicle and to be used as a portable warning signal lighting apparatus by night time.

BACKGROUND OF THE INVENTION

Traditional transducer apparatus derives power from a battery source and requires an on/off switch to control the power supplied to the apparatus. The objective of the invention is to develop an automobile display apparatus to derive power from the cigarette lighter and for the power of the display apparatus to be switched on and off according to the motion and ambient light of the vehicle. Another objective of the invention is to design the display apparatus such that it can be detached from the motor vehicle and to be used as a portable warning signal lighting apparatus by nighttime. A further objective of the invention is to display decorative or useful information with the invented apparatus. The apparatus is further structured to be foldable to form a pocket size portable device when removed from the motor vehicle.

SUMMARY OF THE INVENTION

The present invention is directed to the power supply structure of a display apparatus producing an electrically generated lighting effect. The power supply of the apparatus is derived from battery or connected to the cigarette lighter socket of an automobile. A light sensitive component is installed to switch on or off the apparatus according to the optical signal picked up. The display portion of the apparatus can be a panel selected from a variety of graphic designs, three dimensional design, words, phrases and picture design; or to be used as a photo frame. A pattern generator enables the display apparatus to generate different lighting effect patterns and with different intensity. Another important preferable feature is to include an emergency signal mode enabling the display apparatus to be detached from the motor vehicle and to be used as a portable warning signal lighting apparatus by night time. Said emergency signal mode provides high intensity lighting to catch attention of people. Preferably the high intensity light beam is encoded with pulsed codes such as Morse code to request help.

Embodiments of the invention are particularly suited for use, for example, display apparatus in automobiles to produce lighting effects to enhance driving pleasure at night. With a motion sensor, the apparatus is maintained in a switch-on position when the car is in motion. The motor vehicle motion sensor can be a mechanical inertia sensor or an electrical sound detection sensor, which picks up the continuous running engine sound conducted through the body of the vehicle to the sound detection sensor. When a light sensor is equipped, the display apparatus can be automatically switched on, when a predetermined darkness level is detected by the optical sensor. The power of the device is automatically switched off when the car is not in motion or in daytime. When the display apparatus is detached from the motor vehicle, an internal battery which stores energy enables the display apparatus to be switched into a emergency signal mode suitable for end users to signal the near by traffic at night time. This is an useful feature for motor vehicle driver to safely walk to an emergency phone when the motor vehicle broke down on a highway at night. As compared with the normal decoration display mode, the emergency signal mode is desirable to be switched to an eye catching flickering pattern together with a higher light intensity. The increase in intensity can be achieved by increasing the power delivered to the light transducer or by focusing the light beam. The pulsing of high intensity light beam may be further encoded by Morse code to request help if required. Typical encoded Morse code to request help is represented by the three letters "SOS" which are encoded into three short light pulses, then three longer duration light pulses and then followed by another three short light pulses.

BRIEF DESCRIPTION OF DRAWINGS

FIG. 1 is a sectional elevation view of a first embodiment of the present invention;

FIG. 2A is a view of projection AA;

FIG. 2B is another view of projection AA;

FIG. 2C is another view of projection AA;

FIG. 2D is another view of projection AA;

FIG. 8A is a sectional elevation view of an embodiment of a motion sensor;

FIG. 8B is a sectional elevation view of an alternate embodiment of a motion sensor;

FIG. 11A illustrates the side view of an alternative embodiment.

FIG. 11B illustrates the side view of FIG. 11A when the power plug is folded into the recess of the display unit.

FIG. 11C is the bottom view of FIG. 11B.

FIG. 11D if the front view of FIG. 11A.

DESCRIPTION OF THE PREFERRED EMBODIMENTS

Figure 3A:
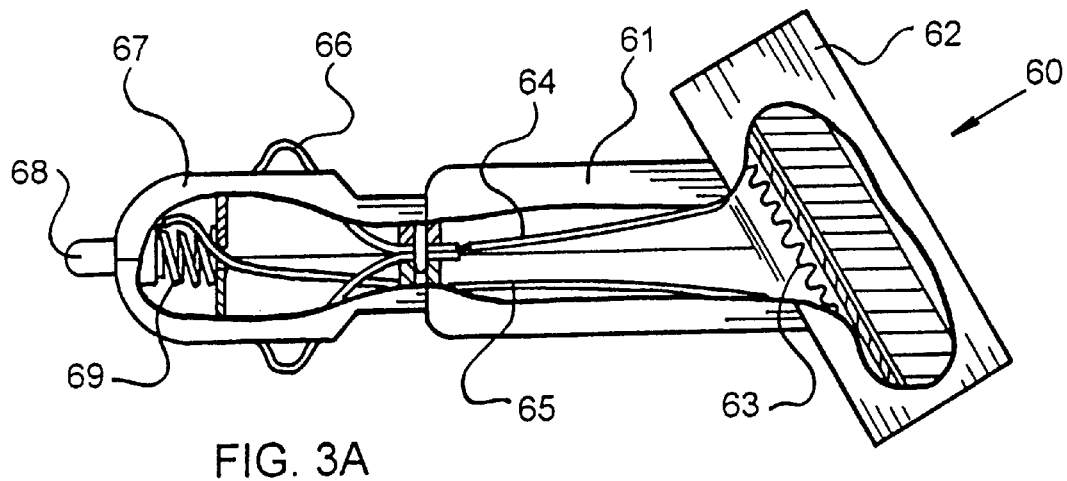
FIG. 3A is an embodiment showing the structure of a motor vehicle cigarette lighter adapter.

A preferred embodiment 20, in accordance with the present invention, of a display apparatus in use with a motor vehicle is illustrated in the elevation view of FIG. 1. The display apparatus comprises of electrical contacts 21 and 22 to conduct 12V power from the motor vehicle; batteries 24, 25 and 26 to provide power to the apparatus when it is detached from the motor vehicle; emergency mode switch 31 which is normally not accessible to end user unless the apparatus is detached from the motor vehicle cigarette lighter; display module 38 which can be pivoted with the cigarette lighter adapter portion along the hinge 33 and the motion sensor comprises of the contacts 29, 30 and the metal ball 32. The display module 28 comprises of an internal printed circuit board (PCB) assembly 23. 36 is the chip on board controller integrated circuit. One or more pre-focused light emitting diodes (LEDs) 37 are attached on the appropriate locations of the PCB assembly to generate the lighting effect. The LEDs can also be of chip on board type; that is, the LEDs are directly bonded onto the PCB. The display apparatus can be triggered by pushing the manual trigger switch 34. Light sensor 35 gives an optional feature enabling the display apparatus to be automatically turned on only during nighttime. The front portion of the display apparatus 39 can be a fixed decoration part, a factory assembled decoration part, or an user selectable and assembled decorative panel. FIG. 2A shows an embodiment of the decoration part in the shape of a symmetrically shaped diamond. FIG. 2B is another embodiment showing graphic patterns and letters; alternatively, different words or phrases can also be displayed. FIG. 2C is another embodiment showing pictures. The decoration portion 39 can be structured to hold photographs or slides. FIG. 2D shows a transparent cover such that the arrangement of the LEDs forms the decoration pattern. The length of the cigarette adapter portion is preferably to be adjustable.

Figure 3B:
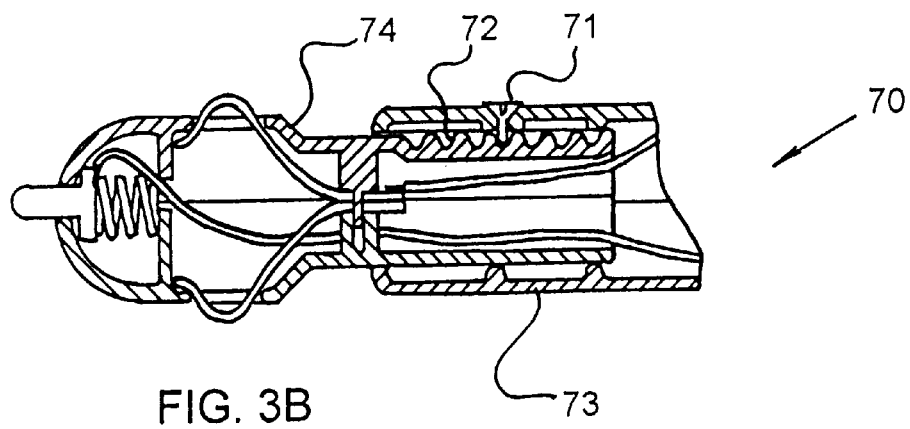
FIG. 3B is a sectional view of 3A showing the structure of an adjustable length motor vehicle cigarette lighter adapter.
Figure 3C:
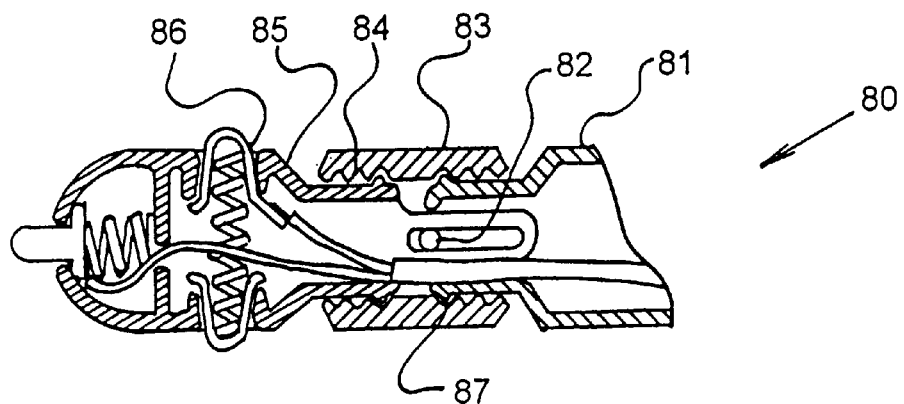
FIG. 3C is a sectional view of another adjustable length motor vehicle cigarette lighter adapter.

FIG. 3A shows another embodiment such that the display module additionally comprises a structure to generate air freshner. In addition of the heat transducer 63, the display module may additionally comprise of a sound transducer and/or motion transducer to enhance the display features of the invented apparatus. FIG. 3B shows a sectional view of an embodiment wherein the cigarette adapter portion is of adjustable length to suit for different cigarette lighter socket and panel design. The portion 73 is adjustable relative to the tip portion 74 and the adjusted length is fixed by the location screw 71 mated with the positioning recesses 72. FIG. 3C is another alternate embodiment of the adjustable length cigarette lighter adapter. When the sleeve 83 is rotated, the tip portion 85 and the display end 81 moves in opposite direction and the length of the cigarette lighter adapter is altered.

Although the display panels of FIG. 1 and FIG. 3A are integrally connected with the power plug, the display panel of FIG. 1 is structured to be rotatable from the power plug at the pivot point 33 to provide an angular adjustable function. This function enables the display panel to be optimally positioned according to different environments of the cigarette lighter sockets in different motor vehicles. Integrally connected over here means that the two portions are structurally connected to form a single article. They are not separable parts or loose parts merely connected by wires.

Figure 4:
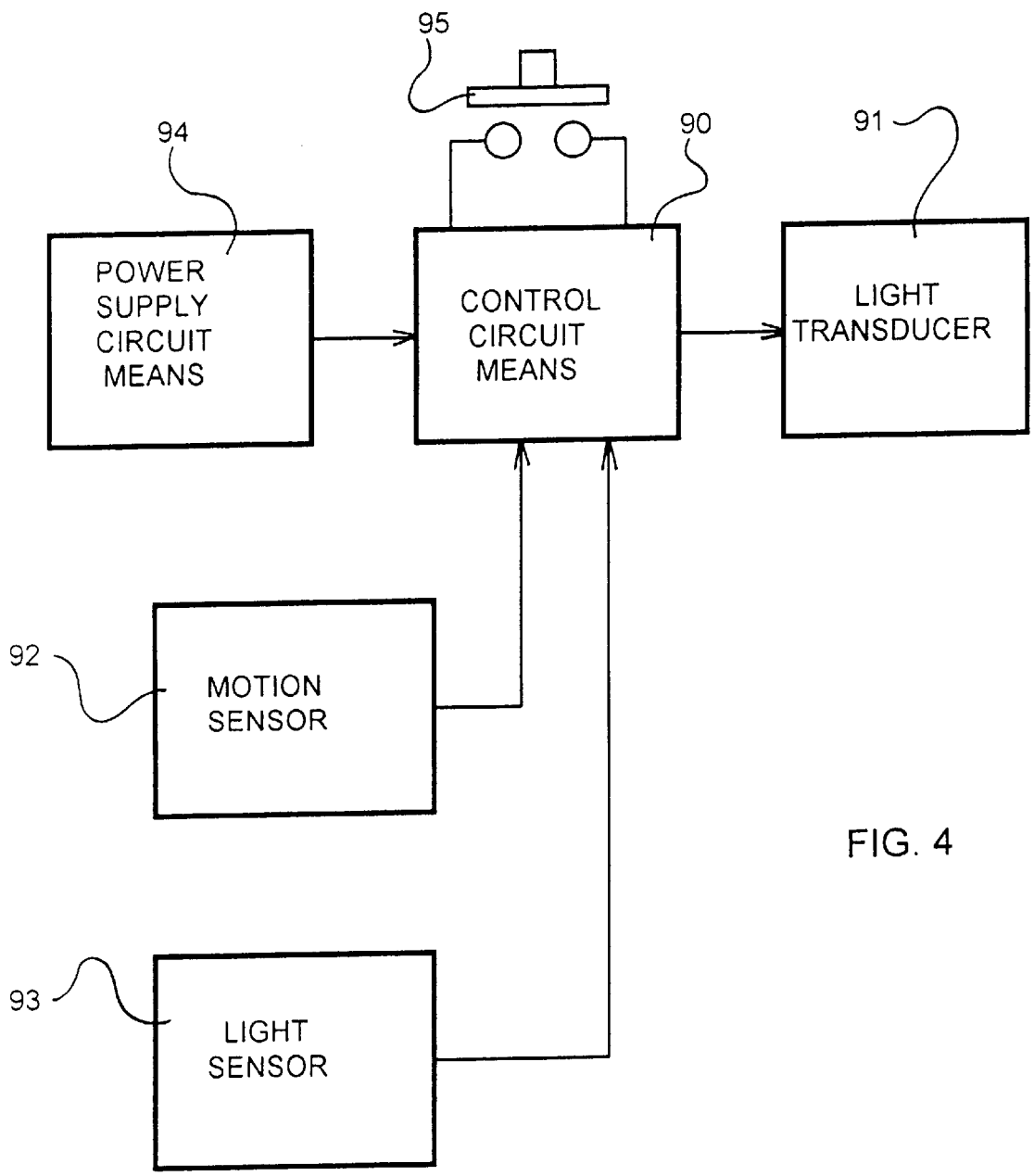
FIG. 4 is the block diagram of a preferred embodiment.

FIG. 4 shows the functional block diagram of the preferred embodiment. The Power supply circuit means 94 performs several functions. Firstly it directs the 12V of the motor vehicle to the circuitry. Secondly it reduces and/or regulates the 12V to a lower voltage required by the working circuitry. Thirdly, it charges up an internally rechargeable battery, an energy storage device which powers the display apparatus when it is detached from the motor vehicle. Fourthly, it governs the switch over of power supply from the motor vehicle power source to the internal battery when the display apparatus is removed. It should be noticed that if non-rechargeable battery is to be installed into the display apparatus, the charging circuit is not required. The control circuit means receives control signals from the manual switch 95, motion sensor 92 and light sensor 93; accordingly the control circuit means turns on and off each light transducer element to provide a desirable display effect. Different flickering patterns and display intensity of the light transducer is also controlled by the control circuit means.

Figure 5:
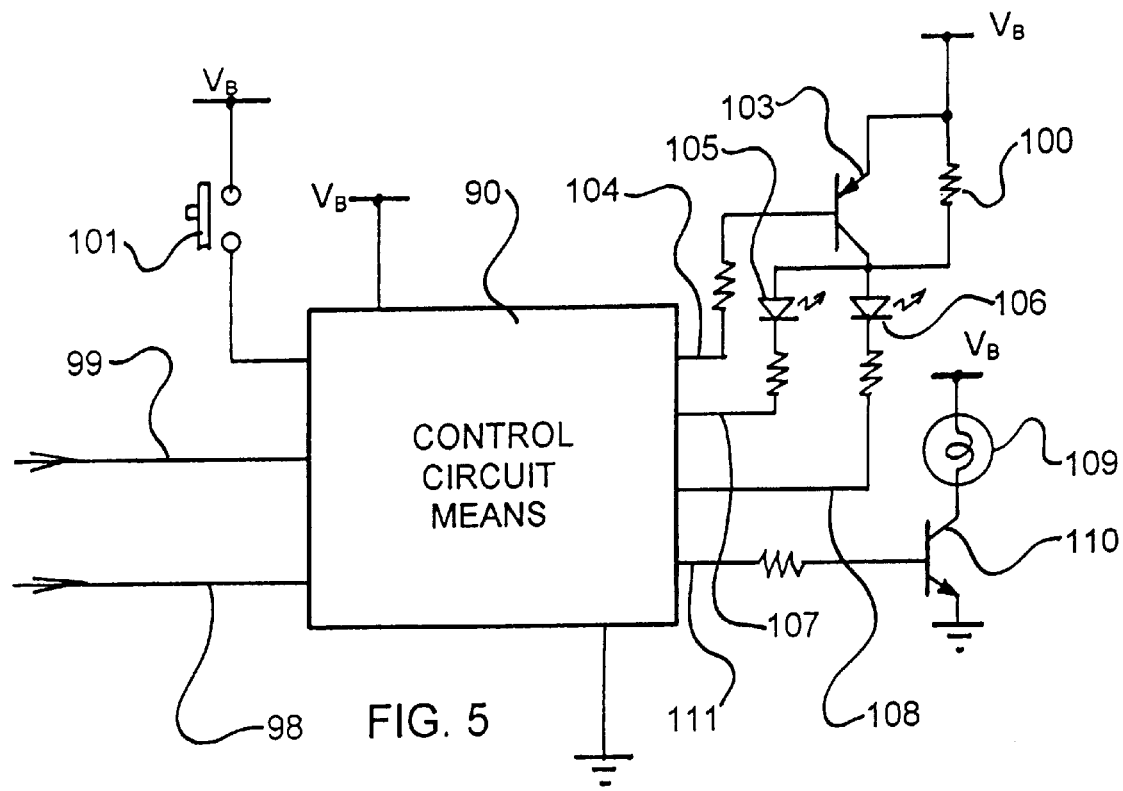
FIG. 5 is another preferred embodiment showing different light transducers.

FIG. 5 shows how the control circuit means is interfaced with typical light transducers. LEDs 105 to 106 are turned on and off according to the driver lines 107 to 108 derived from the control circuit means 90. When driver line 104 goes low, transistor 103 is turned on and short-circuited resistor 100. As a result, higher current flows through the LEDs which are turned on and the light intensity emitted by the LEDs is increased. High light intensity is important when the display apparatus to be switched into the emergency signal mode. Alternatively, the control circuit means 90 may turn on and off a light bulb 109 through a driver transistor 1 10. When the LEDs are mounted onto the PCB in a chip on board method, a focusing front plate look similar to FIG. 2D helps to focus the light beams of the LEDs.

Figure 6:
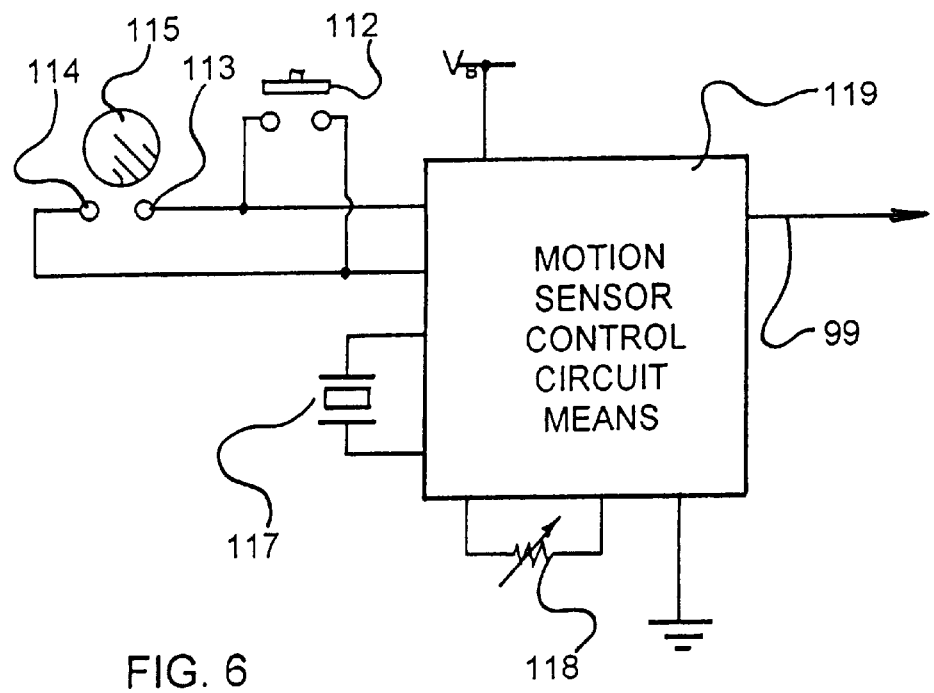
FIG. 6 is a preferred embodiment of the motion sensor.
Figure 9A:
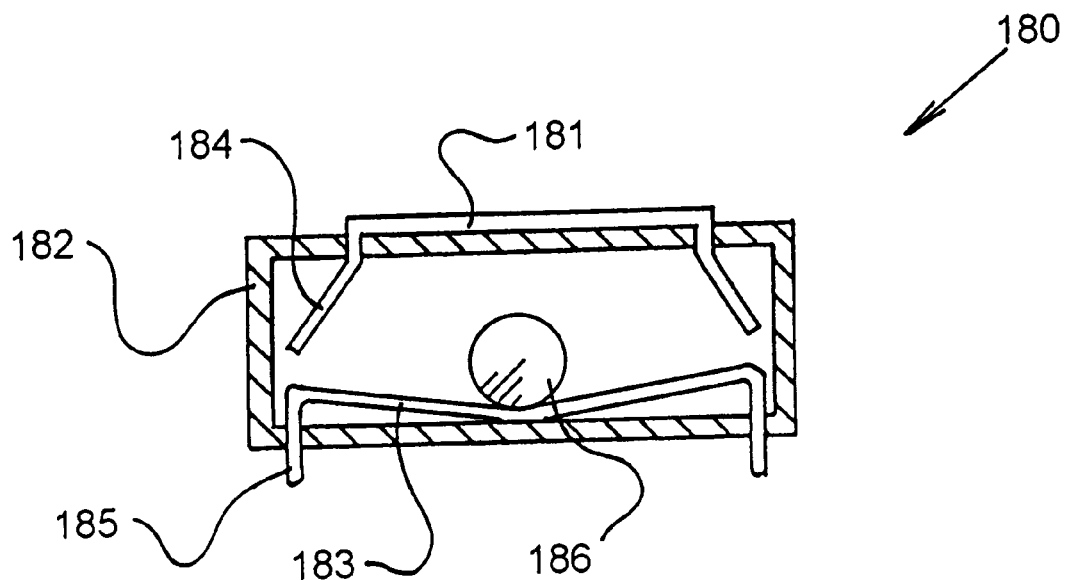
FIG. 9A is a sectional elevation view of another embodiment of the motion sensor.
Figure 9B:
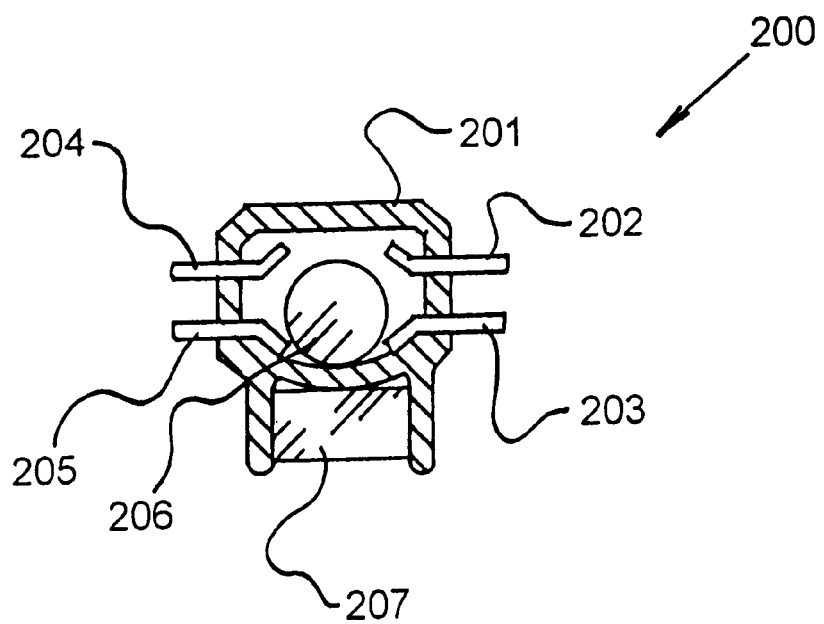
FIG. 9B is a sectional elevation view of another embodiment of the motion sensor.

It is a desirable feature for the standby current of the display apparatus to be of insignificant value so as not to drain down the battery of the motor vehicle. The light display effect is preferable to be turned on only when the motor vehicle is occupied and turned off automatically when it is vacant. To achieve this design objective, a low standby current electronic design is required and a motion sensor is desirable to turn off the light display effect when the motor vehicle is not running for a predetermined period of time. FIG. 6 discloses a typical motion sensor arrangement. Whenever a motor vehicle is in motion, the metal ball 115 of a typical motion sensor makes contact with terminals 113,114 and initiates a trigger signal to be sent to the control circuit means through signal path 99 of FIG. 5 and FIG. 6. Typical embodiment of motion sensor making use of a metal ball is shown in FIG. 9A and FIG. 9B. A manual button is desirable to operate in parallel with the contact terminals 113 and 114 for manual trigger of the display apparatus. Alternative, a manual trigger button 101 can be connected directly to the control circuit means as shown in FIG. 5. When designing the electronic circuit to work with a contact type motion sensor, great care is required to limit the standby current to an insignificant value when the contact terminals is always in contact. This may happen when the motor vehicle is parked on a slope.

When a motor vehicle is riding on a smooth highway for an extended period of time, acceleration and deceleration may not happen frequent enough to maintain consistent retriggering of a lower sensitivity version of mechanical motion sensor such as those shown in FIG. 8, FIG. 9A and FIG. 9B. An electrical motion sensor is designed to overcome this design difficulty. The sound detection device 117 of FIG. 6 picks up the sound of the engine and the bumps of the road and initiates trigger signal to the control circuit means 90 through signal path 99. The sensitivity of the electrical motion sensor can be adjusted by an adjustment component 118 which qualify how an electrical signal received from the sound detection device 117 is to be accepted or ignored. Typical example of the sound detection device 117 is piezo transducer and condenser mic. The piezo transducer is usually of much lower standby current but is responsive to a narrow frequency band. A condenser mic is responsive to a broader frequency band but requires a biasing circuit and an amplifier circuit which consumes relatively higher standby current. When a higher current motion sensor such as a condenser mic is used, it is desirable to have a manual trigger switch 101 to turn on the power of the motion sensor and start up the light display effect as long as signal is continuously received by the motion sensor. The power of the circuitry will be turned off automatically when no qualified signal is received for a specified period of time. To turn on the power again requires the manual switched to be retriggered again.

Figure 7:
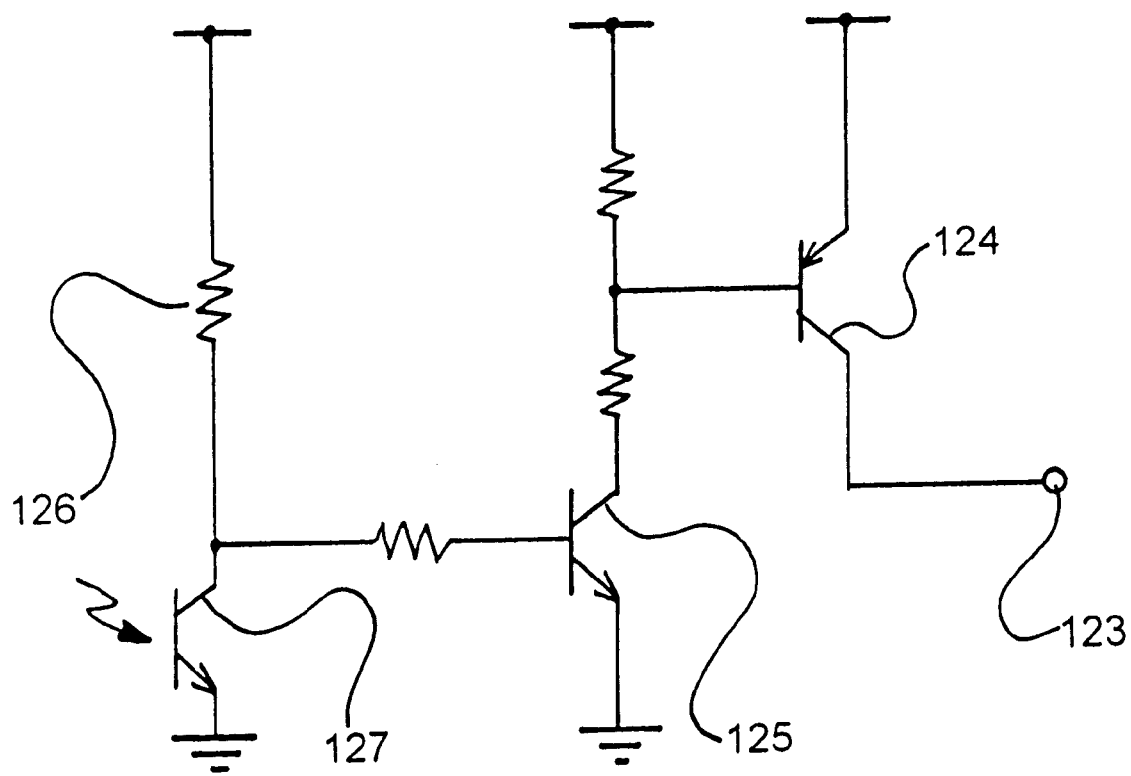
FIG. 7 is a circuit diagram of an embodiment of the light sensor.

It is a desirable feature of the display apparatus when a signal is received from the motion sensor, the light display effect is automatically turned on only during night time. A light sensor is desirable to measure the ambient light of the motor vehicle and enables the light display effect only when the ambient light is lower than a specified level. FIG. 7 discloses the schematic diagram of a light sensor. When the light sensor 127 picks up sufficient amount of light, it is saturated and transistors 125 and 124 are turned off. At night, the light level drops to a low level and the light sensor 127 is cut off. Current flowing through resistor 126 turns on transistors 125 and 124 and eventually the output terminal 123 is switched to a logic high level to enable the control circuit means to turn on the light display effect.

FIG. 8B is an embodiment of a motion sensor. When a motor vehicle is in motion, the inertia of the weight 168 causes the elongated member 166 to be displaced from position 170A to position 170B and causes the terminals 161 and 163 to make contact which in turn triggers the control circuit means. FIG. 8A shows an alternate embodiment of FIG. 8B except that the weight 148 forms as an integral part with the helical spring which returns the weight to the neutral non-triggering position. FIG. 9A shows another alternate embodiment of the motion sensor making use of a metal ball 186 to contact terminals 184 and 185 when the motor vehicle is accelerated or decelerated. The concave shape of the contact plate 183 enables the metal ball to return to the neutral unconnected position when the motor vehicle is not in motion and stayed in a level position. It should be noticed that the concave shape contact plate is not a necessary design feature when the standby current is designed to stay at a low level even when the contact terminals 184 and 185 are making contact together. FIG. 9B discloses an alternate embodiment of FIG. 9A except that the neutral level position of the ferromagnetic metal ball 206 is maintained by a permanent magnet 207.

Figure 10A:
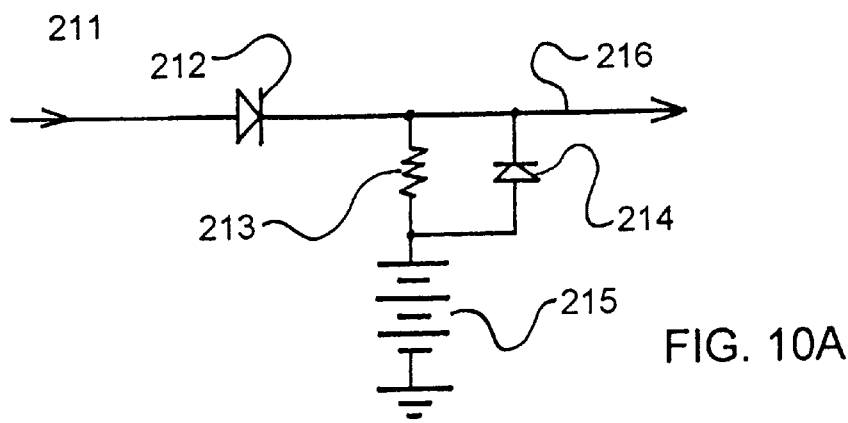
FIG. 10A is a circuit diagram of an embodiment of the power supply circuit means.
Figure 10B:
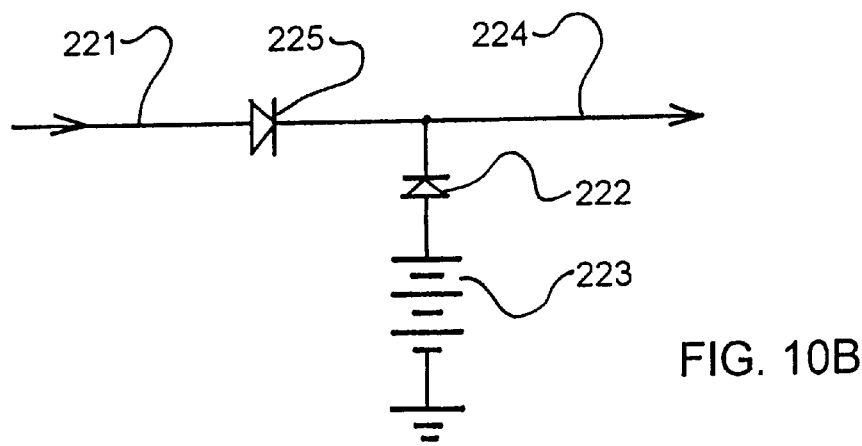
FIG. 10B is a circuit diagram of another embodiment of the power supply circuit means.
Figure 10C:
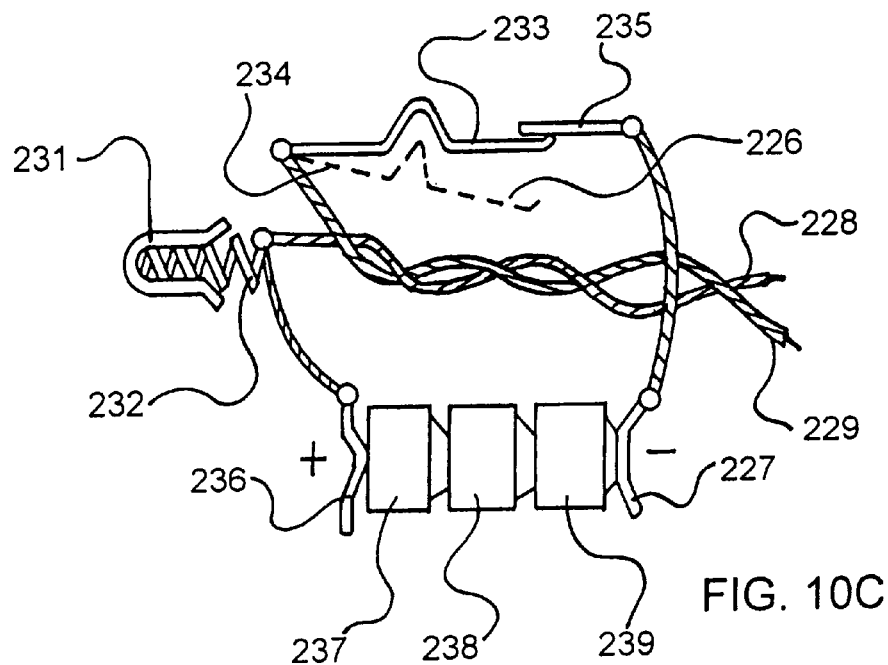
FIG. 10C is a circuit diagram of another embodiment of the power supply circuit means.

An important feature of a preferred embodiment is to enable the display apparatus to be detached from the motor vehicle and to be used as a portable warning signal lighting apparatus by nighttime. This requires an internal energy storage device such as a battery to power the display apparatus when the motor vehicle power source is removed. FIG. 10 B shows a design to serve the purpose. Motor vehicle power which is of higher voltage than the internal battery 223 is feeding through path 221, 224 to the circuitry of the display apparatus. Diode 222 is normally reverse biased and turns off the power path connected to the battery 223. When the display apparatus is disconnected from the motor vehicle, diode 222 is forward biased and the internal battery 223 starts to feed power to the circuitry through path 224. Diode 225 protects the internal battery to be loaded when the surge of the motor vehicle power source which may occur when the engine of the motor vehicle is started. FIG. 10A is an alternate embodiment of FIG. 10B except the internal energy storage device is a rechargeable battery. Resistor 213 provides a current path to charge up the internal battery by the motor vehicle power source. The resistance of the resistor is to be of high value to trickle charge battery at a slow rate because the battery may be connected to the motor vehicle power source for an extended period of time. FIG. 10C discloses a mechanical alternative of the embodiment shown in FIG. 10A. When the display apparatus is inserted into the cigarette lighter socket, the spring contact 233 is moved to the position 226 and disconnected from the terminal 235 which is wired to the negative terminal 227 of the internal batteries 237, 238 and 239. Power of the motor vehicle is obtained from the terminals 231, 233 and delivered to the circuitry through the wire pairs 228 and 229. When the display apparatus is detached from the motor vehicle cigarette lighter, spring contact 223 is in contact with terminal 235 and the internal battery terminals are connected to the wire pairs 228, 229 to automatically initiate the emergency mode.

FIG. 11A illustrated a further embodiment having the pivot point 304 of the display unit 305 and the power plug 301 moved upward. The display unit 305 may comprises a information display such as a LCD display panel represented by 322 of FIG. 11C. The pivot point is important to adjust the viewing angle of the LCD display unit for providing the optimal viewing effect. The display panel may comprise of LED, LCD, plasma or any other material capable to provide the information or graphic display effect. Typical display units are arranged with dot matrix format to display graphic, message or alpha-numeric information according to the display controller and the memory storage device storing graphical or information data to be displayed. The display controller and/or memory storage devices can be represented by an integrated circuit element 36 of FIG. 1. The memory storage device may store both the data information to be displayed and also the program to be executed by the micro-controller. Typical memory storage includes any device which can store digital information such as SRAM, DRAM, ROM, PROM, EPROM and flesh memory. High intensity light transducer 321 such as high intensity LED or light bulb can be used to provide the warning signal effect. It should be noted that the warning signal may include the Morse coded pulsing signal to request help, such as the "SOS" signal. All these pulsing signals can be provided by the micro-controller in charge. The display 322 may require a lower intensity back light when a LCD is used in the dark. Typical LCD back light may be provided by LED or an electro-luminent panel (EL panel). The four buttons 323 to 326 may be included to trigger different operation modes according to the desire of the user. Typical operation modes desirable may include a decorative mode; a higher light intensity lighting or warning mode; and a high intensity encoded pulsing mode to indicate emergency help is requested. Each of these modes is initiated in accordance to the instruction received by the micro-controller reading the memory storage and driving the single or multiple light transducer of the display panel.

The pivot 304 of FIG. 11A linked the display unit 305 with the power plug 303 or the pivot 33 of FIG. 1 enables the viewing angle of the display unit 305 to be adjusted. This feature is particular important for LCD display because the viewable angle of LCD display is limited. Since the viewing angle of the display panel when the apparatus is connected to a horizontal power socket is in opposite direction when said apparatus is connected to a vertically oriented cigarette lighter socket, an orientation mode switch to change the orientation of the graphic pattern upside down is desirable. Secondly, the pivot point 304 is shifted to the upper end of the housing as compared with that of FIG. 1. This design enables the power plug to be folded into a recess channel located at the back of the display unit and formed a pocket size unit as shown in FIG. 11B and FIG. 11C. When removed, the folding design enables the apparatus to become a handy pocketsize device to service different applications. Many pocket size utilities can be programmed using the information display function of the unit. For example, an embedded LCD game program can be stored inside the memory storage means of the apparatus so that the unit can become a hand held game for kids. Alternatively, when a timer is built in, the unit can be used to remind the user when the parking time is due when the vehicle is parked on a parking meter controlled parking spot. Another application of the unit is to provide an alarm clock displaying timing for different time zone to facilitate frequent flying business travelers. In order to enhance the soothing or decoration mode during driving, the controlling microcontroller can be programmed to provide special seasonal graphic patterns during Christmas time. During Valentine day, another type of graphic related to the theme of "Love" can be displayed. If a year around calendar is built in, and the storage area is large enough to hold different seasonal graphics, the apparatus can be programmed to display different types of graphics automatically, at the appropriate dates. Since different user may desire different application of the unit at different time, and the cost of memory storage is expensive, it is preferable to provide programmable memory area, i.e. the storage means inside the apparatus to receive different executable program or graphic patterns downloaded from a computer. Typical programmable memories are SRAM and Flash memory. This feature enables the motor vehicle accessory unit to service multiple applications although a different application may be invented in the future time after the product is sold to the customer. Socket 306 of FIG. 11B represents a serial port or USB port for the unit to be connected with a computer for downloading a program or different graphic patterns. Alternatively, this port can be connected with a telephone or mobile phone to receive executable program downloaded from the internet.

FIG. 11D illustrates the front view of the decorative panel. The graphic, message or alpha numeric display is represented by the area 322. High intensity light transducer 321 is configured to provide the warning of help signal discussed. The control buttons 323 to 326 can be used to select different operation modes, manage data download or as the game controller pad of the LCD game stored in the unit.

It should be noted that various modification of the embodiment is possible. The internal battery may be positioned inside the display module 38 of FIG. 1. The display module may also be detachable from the cigarette lighter adapter portion with a connector. Alternatively, the display portion may be connected to the cigarette lighter adapter portion by a cable so that the user has more freedom to position the display unit. Further modification of the invention is to have the display apparatus to be a self contained unit with internal battery and the battery can be recharged through a detachable cable/adapter connected to the power source of the motor vehicle.

The preferred embodiments of the invention described herein are exemplary and numerous modifications, dimensional variations and rearrangements can be readily envisioned to achieve an equivalent result, all of which are intended to be embraced within the scope of the claims to be submitted in the regular patent application to be followed.

What is claimed is:

1. A display apparatus useful in combination with a vehicle comprising:

power plug dimensioned to plug into the cigarette lighter socket of a vehicle and to receive power from said vehicle;

light transducer configured to provide a high light intensity encoded emergency signal for requesting help;

said light transducer is further configured to be operative to provide said encoded emergency signal when said power plug is removed from the cigarette lighter socket of the vehicle; and, said emergency signal is available only when the power plug removend from said cigarette lighter socket.

2. The apparatus of claim 1 further comprising:

a display panel to provide a lower light intensity decorative or information display;

data storage means providing data to be displayed onto said display panel; and controller means to control graphic or data to be displayed on said display panel in accordance to the program data stored in said data storage means.

3. The apparatus of claim 2 wherein said light transducer locates next to said display panel.

4. The apparatus of claim 1 wherein said encoded emergency signal is represented by a predefined pulsing pattern of light.

5. The apparatus of claim 2 wherein said display panel is an integral part of said power plug.

6. The apparatus of claim 5 wherein said display panel is configured to pivot against said power plug to define the viewing angle of said display panel.

7. The apparatus of claim 2 wherein said display panel and said power plug are foldable to convert said apparatus into a pocket size apparatus.

8. The apparatus of claim 2 comprising the following operation modes:

(a) decorative mode;

(b) lighting and/or warning mode; and (c) encoded pulsing mode to indicate emergency help requested.

9. A display apparatus useful in combination with a vehicle comprising:

power plug dimensioned to plug into the cigarette lighter socket of a vehicle and to receive power from said vehicle and a display panel supported by said power plug to provide a low light intensity decorative graphics and/or information display;

data storage means to store data to be displayed onto said display panel; and controller means to control graphic or data to be displayed on said display panel in accordance to the digital data stored in said data storage means.

10. The apparatus of claim 9 further configured to provide a higher light intensity warning mode.

11. The apparatus of claim 10 further comprising a light transducer to provide said higher intensity warning mode wherein said light transducer locates next to said display panel.

12. The apparatus of claim 10 wherein said higher light intensity warning mode is encoded with a predefined pulsing pattern of light to ask for help.

13. The apparatus of claim 9 wherein said display panel is a dot matrix display.

14. The apparatus of claim 9 wherein said display panel is configured to pivot against said power plug to define the viewing angle of said display panel.

15. The apparatus of claim 9 wherein said display panel and said power plug are foldable to convert said apparatus into a pocket size transportable apparatus.

16. The apparatus of claim 9 wherein the data or program stored in said memory storage means is downloaded from an external data source.

17. The apparatus of claim 9 further including a display orientation mode switch to define the orientation of the graphic or message display.

18. A display apparatus useful in combination with a vehicle comprising:

power plug dimensioned to plug into the cigarette lighter socket of a vehicle and to receive power from said vehicle and a display panel supported by said power plug to provide a decorative graphics and/or information display; wherein said display panel is configured to pivot against said power plug to define the viewing angle of said display panel.

19. The apparatus of claim 18 wherein said display panel and said power plug are foldable to convert said apparatus into a pocket size envelop.

20. The apparatus of claim 18 comprising light transducer located on said display panel to provide high light intensity warning signal.

21. The apparatus of claim 20 further configured to provide a lower light intensity decorative mode.

22. The apparatus of claim 18 further comprising:

data storage means to store data to be displayed on said display panel; and controller means to control graphic or data to be displayed on said display panel in accordance to the digital program data stored in said data storage means.

23. The apparatus of claim 22 wherein the data or program stored in said memory storage means is downloaded from an external data source.

* * * * *